United States Patent [19]

Mukoyama et al.

[11] 4,353,801
[45] Oct. 12, 1982

[54] SPECIAL SOLVENT COLUMN FOR GPC AND GPC METHOD USING THE SAME

[75] Inventors: Yoshiyuki Mukoyama; Nobutoshi Chikazumi, both of Hitachi; Hatuo Sugitani, Ibaraki, all of Japan

[73] Assignee: Hitachi Chemical Company, Ltd., Tokyo, Japan

[21] Appl. No.: 188,243

[22] Filed: Sep. 17, 1980

[30] Foreign Application Priority Data

Oct. 6, 1979 [JP] Japan ................................ 54/129218

[51] Int. Cl.$^3$ ............................................ B01D 15/08
[52] U.S. Cl. ................................. 210/635; 210/198.2
[58] Field of Search ............. 210/635, 656, 659, 198.2

[56] References Cited

U.S. PATENT DOCUMENTS 3,725,260 3/1973 Stalling et al. .................. 210/656 X

OTHER PUBLICATIONS

Chromatographic and Allied Methods by Mikes et al., John Wiley & Sons, N.Y., N.Y., pp. 351-353, 1979.
Introduction to Modern Liquid Chromatography by Snyder et al., John Wiley & Sons, N.Y., N.Y., pp. 503-509, 260-264, 316, 317, 2nd edition 1979.

Primary Examiner—John Adee
Attorney, Agent, or Firm—Antonelli, Terry & Wands

[57] ABSTRACT

A special solvent column for gel-permeation chromatography packed with porous styrene-divinylbenzene type copolymer spherical particles in immersed and swollen state with a special eluent, which is a mixture of hexafluoroisopropanol and a chlorine-containing organic solvent such as chloroform, is effective for enlarging the range of samples to be analyzed and molecular-weight distribution measurement can be conducted rapidly at normal temperatures by using said column.

10 Claims, 5 Drawing Figures

SPECIAL SOLVENT COLUMN FOR GPC AND GPC METHOD USING THE SAME

BACKGROUND OF THE INVENTION

This invention relates to a special solvent column for gel-permeation chromatography useful for measuring molecular-weight distributions of organic materials, the molecular-weight distributions of which have been impossible in gel-permeation chromatography (hereinafter referred to as "GPC") using as an eluent tetrahydrofuran or chloroform usually used and a GPC method using said special solvent column.

It is an important thing to measure molecular-weight distributions of high polymers and organic oligomers rapidly in developing excellent organic materials and conducting careful quality control. In order to respond to such a requirement, the GPC method has been developed and applied widely as a comparatively simple method for measuring molecular-weight distributions. The GPC is an analyzing method as described in, for example, J. C. Moore: J. Polym. Sci., A2, 835 (1964), using a tube made of stainless steel, etc., packed with porous styrene-divinylbenzene copolymer spherical particles (packing material) as a major constituent (gel-permeation column) and comprising the steps of dissolving a sample to be analyzed (solute molecules) in a moving phase solvent (eluent), introducing the sample solution into the column by using a constant flow pump from an inlet so as to pass through the column to an exit while developing, fractionating the sample depending on molecular sizes from larger ones to smaller ones in relation to pore sizes of the packing material, and measuring separation of the moving phase against the elution volume and the amount of the solute molecule flowed out by using a suitable detector. Therefore, in order to conduct rapid and precise measurement of molecular-weight distributions by the GPC method, the quality of the column packed with a packing material is very important.

Further, even if porous styrene-divinylbenzene copolymer spherical particles mentioned above are used as a packing material, there often takes place reversion of separation of the solute molecules and the effluent order depending on the kind of the moving phase solvent. This can be seen when a polar solvent having a large solubility parameter such as methanol or water is used as the moving phase solvent.

Thus, there is a limitation to solvents usable for measuring molecular-weight distributions effectively by using the GPC method and it is recommended to use a column packed with a packing material sufficiently immersed in the same solvent as used for flowing. As the solvent, tetrahydrofuran (THF) and chloroform ($CHCl_3$) are generally used. But some samples are not soluble in THF or $CHCl_3$ and it is not possible to measure these samples at normal temperatures. Examples of such samples are polyethylene terephthalate (PET), PET oligomers, polyesterimides, and the like. As a method for measuring such a hardly soluble sample, there is employed a GPC method carried out at a high temperature (about 80° to 140° C.) considering the fact that such a sample is soluble in hot cresol type solvent. But since the measurement is carried out at such a high temperature, there are many problems in that a true molecular-weight distribution of the sample can hardly be obtained due to hydrolysis and the like of the sample, operation of the GPC apparatus is not easy and lacks in safety, reproducibility of data is not so good, and the like.

Therefore, extensive studies have been made on solvents which can sufficiently dissolve a sample at normal temperatures and have a molecular-weight distribution measuring effect against porous styrene-divinylbenzene copolymer spherical particles and thus this invention has been accomplished.

SUMMARY OF THE INVENTION

This invention relates to a special solvent column for gel-permeation chromatography packed with porous styrene-divinylbenzene type copolymer spherical particles in immersed and swollen state with an eluent, characterized in that as the eluent, a mixture of hexafluoroisopropanol and a chlorine-containing organic solvent is used.

This invention also provides a gel-permeation chromatographic method comprising passing an eluent dissolving a substance to be measured through a column packed with porous styrene-divinylbenzene type copolymer spherical particles and fractionating the substance depending on largeness of molecular weights, characterized by using as the eluent a mixture of hexafluoro-isopropanol and a chlorine-containing organic solvent.

DESCRIPTION OF THE PREFERRED EMBODIMENTS

Figure 1:
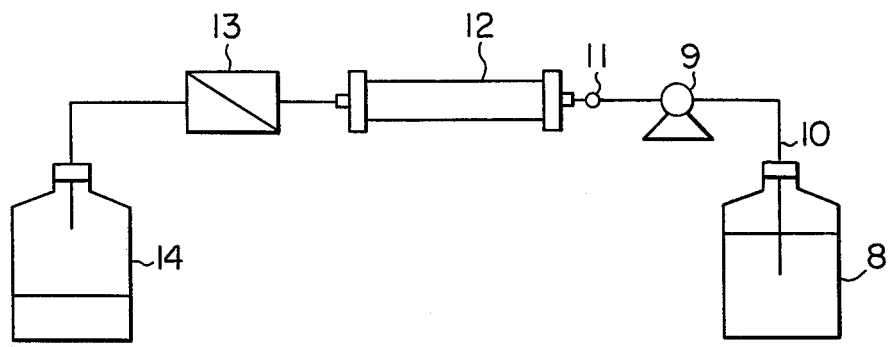
FIG. 1 is a schematic drawing of a gel-permeation chromatograph.

The packing material for the special solvent column used in this invention is porous styrene-divinylbenzene type copolymer spherical particles. The particle size of these particles is usually 50 μm or less, particularly preferably 5 to 20 μm. The pore size of these particles is sufficient when the pores allow the organic material to be separated to go in and out freely in an eluent. Since these particles have pores which allow a sample to be separated to go in and out freely in an eluent, it seems possible to measure a molecular-weight distribution. For example, in the case of polystyrene molecules, the pore sizes are those which allow going in and out of from the monomer to a polymer having a molecular weight of several millions.

As the styrene-divinylbenzene type copolymers, there can be used a styrene-divinylbenzene copolymer, a divinylbenzene polymer, an ethylvinylbenzene-divinylbenzene copolymer, a styrene-ethylvinylbenzene-divinylbenzene terpolymer, and the like. These polymers may contain, as a part of the constituting units, acrylic acid ester, methacrylic acid ester, vinyl acetate, vinyl chloride, and the like.

The porous styrene-divinylbenzene type copolymer can be produced by suspension polymerization of styrene, divinylbenzene, ethyldivinylbenzene, or the like monomer in an aqueous medium in the presence of an organic solvent. In such a case, there can be used as a polymerization catalyst peroxides such as benzoyl peroxide, t-butyl perbenzoate, and the like; azobisnitrile compounds such as azobisisobutyronitrile, and the like.

As the organic solvent, there can be used aromatic hydrocarbons such as toluene, diethylbenzene, diphenyl, and the like; aliphatic hydrocarbons such as hexane, octane, and the like; alcohols such as isoamyl alcohol, and the like. The organic solvent can be used in an amount of about 10 to 200% by weight based on the weight of the monomer(s) (the starting material). The aqueous medium is used in an amount of about 1 to 5 times as much as the weight of the monomer(s). The reaction temperature is usually 60° to 150° C. It is preferable to add a hardly soluble phosphate such as tricalcium phosphate, a surface active agent to the reaction system.

The material of the column tube to be packed with a packing material is sufficient when it is not corroded with the eluent and has pressure resistance. In general, the tube is made of stainless steel or a tetrafluoroethylene resin (Teflon) and stainless steel inner surface of which is coated with a tetrafluoroethylene resin can also be used for producing the column tube. The size of the tube can be determined depending on objects of analyses and there is no particular limitation thereto. For example, there can be used a tube having an inner diameter of 8 mm with a length of 50 cm, a tube having an inner diameter of 7.5 mm with a length of 61 cm, and the like. It is also possible to use a glass capillary column and a Teflon tube.

As the chlorine-containing organic solvent used as a component of the eluent, there can be used chlorinated hydrocarbons having preferably 1-7 carbon atoms such as chloroform, tetrachloroethane, trichloroethane, trichloroethylene, dichlorobenzene, trichlorobenzene, and the like. These chlorine-containing organic solvents can be used as a mixture thereof.

When PET, polyesterimides, polyamides and the like are used as a sample, the use of chloroform ($CHCl_3$) is preferable from the viewpoint of solubility. The mixing ratio of hexafluoroisopropanol (HFIP) to the chlorine-containing organic solvent is not particularly limited, so long as the sample to be analyzed can be dissolved well and HFIP or the chlorine-containing organic solvent is not used alone (i.e. 100% in the mixing ratio). Usually the mixing ratio of HFIP/the chlorine-containing organic solvent is 5/95 to 70/30 (by volume). For example, when a PET oligomer is used as a sample, the ratio of $HFIP/CHCl_3 = 1/9$ (by volume) is most preferable, and when PET type polymers, polyesterimides, and polyamides are used as a sample, the ratio of $HFIP/CHCl_3 = 5/5$ (by volume) is most preferable. When HFIP alone is used as the eluent, polystyrene which is usually used as a standard substance is not soluble in HFIP and there is a possibility to bring about change of properties of a sample due to strong polarity of HFIP. Further, since HFIP is expensive and has great irritant action on the skin, it is preferable to reduce the amount of HFIP as an industrial analyzing method. On the other hand, when the chlorine-containing organic solvent such as $CHCl_3$ is used alone, there is no change from the conventional GPC and there is a limitation in dissolving ability of samples, for example, in the above-mentioned case, the GPC measurement is impossible since the sample is insoluble in $CHCl_3$.

As a method for packing the column tube with a packing material, a wet packing method wherein a packing material is immersed and swollen with the mixed solvent as mentioned above, for example, in the form a slurry, and said slurry is placed in the tube is preferable, particularly, a high-pressure slurry packing method wherein the tube is packed with the slurry mentioned above under pressure by using a constant flow pump is more preferable. Or a packing material is made into a slurry by using a solvent such as THF, $CHCl_3$ or the like, and placed in the tube and the solvent is replaced by the mixed solvent mentioned above before the use of the column previously or during the use of the column. Further, a dry packing method wherein the tube is packed with a dry packing material and then the tube is filled with the mixed solvent mentioned above to immerse and swell the packing material in the tube may also be used. The wet packing method is more preferable from the viewpoint of performance of the column.

Samples which can be used for measuring molecular-weight distributions by using the column of this invention are thermoplastic resins, thermosetting resins, natural resins, starting materials of these resins, intermediates of these resins, by-products thereof, and the like, so far as they can be dissolved in the above-mentioned mixed solvent used as the eluent. Examples of these resins are polystyrene, acrylic resins, polyethylene terephthalate, polyethylene terephthalate oligomers, polyesterimides, polyesteramides, polyimides, polyamide-imides, polyamides, epoxy resins, phenolic resins, melamine resins, and the like.

Among these resins, polyimides, polyamides, polyamide-imides, polyesterimides, polyethylene terephthalate, polyethylene terephthalate oligomers cannot be measured by using the conventional general-purpose eluent, THF alone. Further, polyamide-imides and polyimides cannot be measured by using cresol. In addition, when cresol and DMF (dimethyl formamide) are used for measuring molecular weights, since these have high viscosities at normal temperatures, high-pressure is necessary to accelerate flowing out, which is not suitable for practical use. Therefore, when these solvents are used, the measurement is conducted with heating in order to lower the viscosity. In contrast, since the mixed solvent used in this invention can be used for the measurement at normal temperatures, such elaborated procedures as mentioned above are not necessary. Further, heating of the sample as mentioned above is not preferable from the viewpoint of change of properties of the sample.

The GPC column cannot be used for measuring molecular-weight distributions unless the three, i.e. the packing material, the eluent, and the sample, are properly fitted. That is, the eluent should dissolve the sample. In this respect, the eluent used in this invention is excellent in dissolving properties compared with the conventional general-purpose eluent as mentioned above. Further, the eluent should have a low viscosity at normal temperatures after dissolving the sample. The eluent used in this invention is also excellent in this respect. In addition, in the relation between the eluent and the packing material, separation and effluent order of the solute molecules should be in good order from ones having larger molecular weight to ones having smaller molecular weight. In this sense, when a porous styrene-divinylbenzene type copolymer is used as the packing material, the use of water, methanol, or the like as an eluent is not preferable. In contrast, the mixed solvent used in this invention is well fitted with the porous styrene-divinylbenzene type polymer without showing such a disadvantage.

The special solvent column of this invention can be used in the GPC analysis, for example, as shown in FIG. 1. Referring to FIG. 1, an eluent of a mixed solvent of HFIP and a chlorine-containing organic solvent is stored in a vessel 8 and passed through a pipe 10 by a pump 9 to a column 12. A sample to be analyzed is dissolved in the same eluent as mentioned above and injected into a sample inlet 11. The injected sample is fractionated depending on the size of molecular weight during the travel through the special solvent column 12 and taken off from the column 12 together with the eluent successively and passed through a detector 13. By the detector 13, the sample having certain molecular weights is determined quantitatively continuously. The eluent and the sample passed through the detector are received by a vessel 14. As the detector 13, there can be used those measuring and determining refractive indexes, absorption, radiation intensity, etc., of ultraviolet light, infrared rays, visible light, etc. Further, the eluent and the sample to be analyzed passed through the column 12 can be sampled separately by different vessels at intervals of certain period of time to measure and determine refractive indexes, absorption, etc., or to provide to another analysis and retrieval. Flowing of the solution can be conducted by using a pump at a constant flow rate and there is no particular limitation thereto. The flow rate can be determined properly by considering the size of the column, and the packing material filling the column. The flow rate of 0.1 to 10 ml/min is usually employed.

As mentioned above, according to this invention, the packing material, the eluent and the sample are well fitted and the range of samples to be measured practically can be broadened.

This invention is illustrated by way of the following Examples.

EXAMPLE 1

Figure 2:
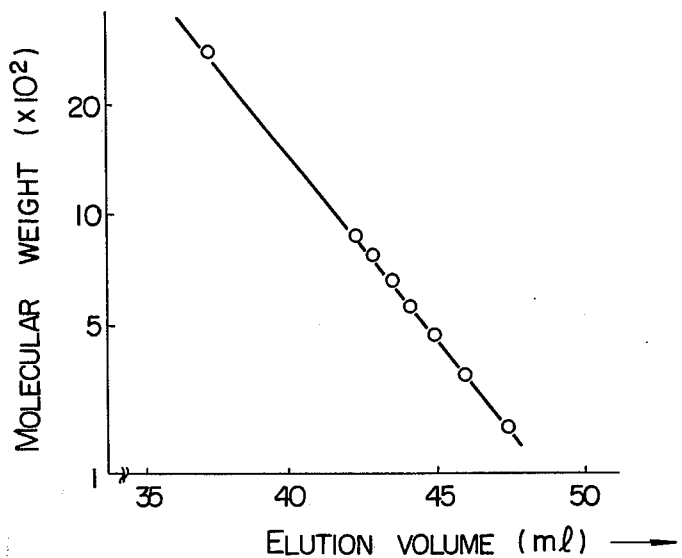
FIG. 2 is a graph of calibration curve based on the results of Example 1.

Porous styrene-divinylbenzene copolymer spherical particles having a particle size of 5 to 15 μm, and a molecular-weight-distribution measuring ability of a molecular weight of $5 \times 10^3$ of polystyrene (exclusive limit $5 \times 10^3$) were used as a packing material. A column made of stainless steel and having an inner diameter of 8 mm and a length of 50 cm was packed with slurry prepared by using a mixed solvent of HFIP/CHCl$_3$=1/9 (volume ratio) and the packing material mentioned above at a filling flow rate of 5 ml/min for 30 min. Two columns containing a similar packing material but having an exclusive limit of $7 \times 10^4$ were prepared in the same manner as mentioned above. These three columns (exclusive limit: $5 \times 10^3$ ... 1, $7 \times 10^4$ ... 2) were incorporated in series in a high-speed liquid chromatograph equipped with a UV monitor (254 nm) and a mixed solvent of HFIP/CHCl$_3$=1/9 (volume ratio) as an eluent was flowed at a flow rate of 1.0 ml/min. After dissolving polystyrene having known molecular weights (a mixture of molecules having average molecular weights of 2800, 890, 786, 682, 578, 474, 370 and 266) in the eluent, the resulting solution was poured on the head of a column. The obtained chromatogram was shown in the form of an elution volume-molecular weight curve as shown in FIG. 2. The measurement was conducted at normal temperatures.

EXAMPLE 2

Figure 3:
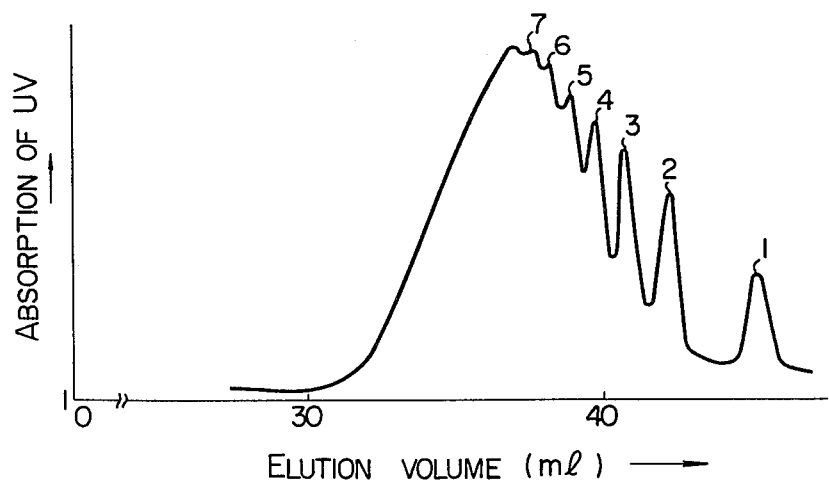
FIGS. 3 to 5 are graphs showing results of the GPC measurements in Examples 2 to 4.

The molecular-weight distribution measurement of a PET oligomer dissolved previously in an eluent (a mixed solvent HFIP/CHCl$_3$=1/9 (volume ratio)) was conducted under the same conditions as described in Example 1. The obtained chromatogram was shown in FIG. 3. In FIG. 3, "n" in the formula of the PET oligomer, i.e.

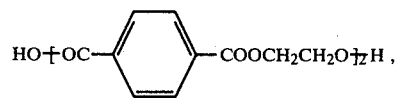

is integers of 1 to 7, which correspond to the numbers 1 to 7 at individual peaks of the curve.

EXAMPLE 3

Figure 4:
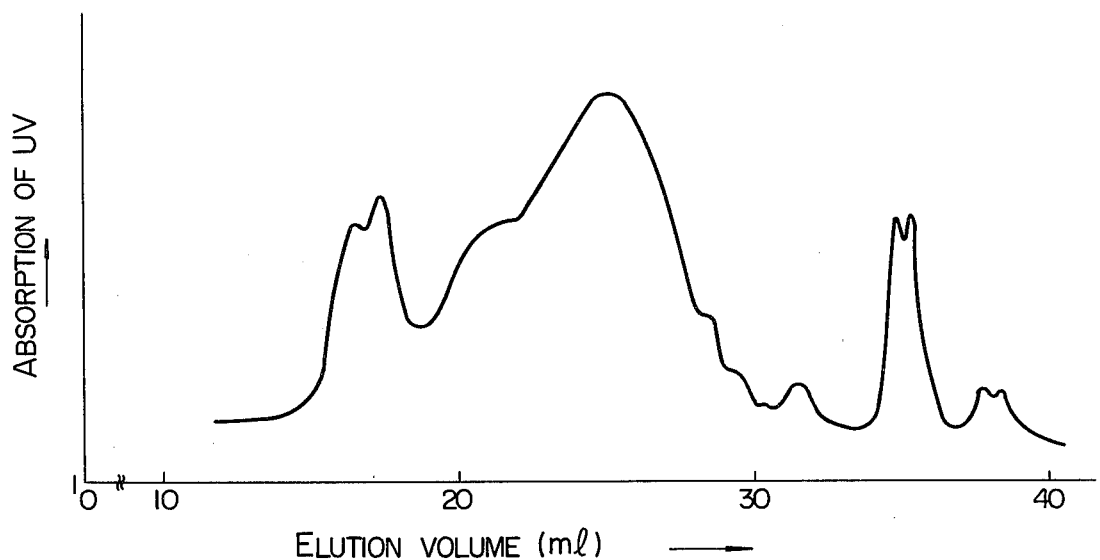

A column packed with a packing material having an exclusive limit of $7 = 10^4$ and a column packed with a packing material having an exclusive limit of $5 \times 10^5$ were prepared in the same manner as described in Example 1 except for using a mixed solvent of HFIP/CHCl$_3$=5/5 (volume ratio). These columns were incorporated in series in a high-speed liquid chromatograph equipped with a UV monitor (254 nm) and a mixed solvent of HFIP/CHCl$_3$=5/5 (volume ratio) as an eluent was flowed at a flow rate of 1.0 ml/min. After dissolving a polyesterimide commercially available in the eluent previously, the resulting solution was poured on the head of a column. The obtained chromatogram was shown in FIG. 4.

EXAMPLE 4

Figure 5:
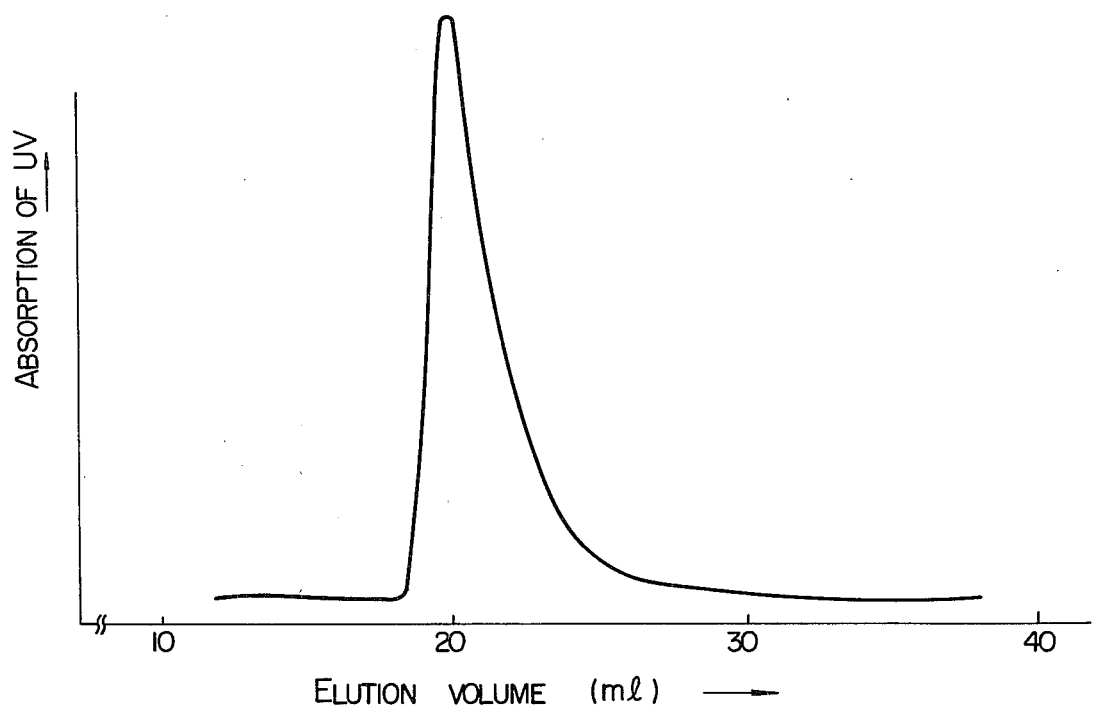

Molecular-weight distribution of PET previously dissolved in the same eluent as used in Example 2 was measured under the conditions as described in Example 2. The obtained chromatogram was shown in FIG. 5.

As mentioned above, when the column of special mixed solvent of HFIP and a chlorine-containing organic solvent is used, organic materials such as PET oligomers, PET, polyesterimides and the like which are insoluble in THF or chloroform, can be used for measuring molecular-weight distributions by using a general-purpose analyzing apparatus at normal temperatures with good separability. Further, when a suitable mixing ratio of the solvent is employed, an elution volume-molecular weight curve as to polystyrene can easily be obtained, said curve being able to be used as a basis for calculating approximate molecular weight of polystyrene; this is very advantageous as an industrial analyzing means. That is, according to this invention, the range of samples practically useful for measuring molecular-weight distributions is broadened.

What is claimed is:

1. In a column for gel-permeation chromatography packed with porous styrene-divinylbenzene type copolymer spherical particles which are in an immersed and swollen state with an eluent prior to use, the improvement wherein said eluent is a mixture of hexafluoroisopropanol and a chlorine-containing organic solvent and wherein the mixing ratio of the hexafluoroisopropanol to the chlorine-containing organic solvent in the mixture is 5/95 to 70/30 by volume.

2. A column for gel-permeation chromatography according to claim 1, wherein the chlorine-containing organic solvent is chloroform, tetrachloroethane, trichloroethane, trichloroethylene, dichlorobenzene, trichlorobenzene, or a mixture thereof.

3. A column for gel-permeation chromatography according to claim 1, wherein the chlorine-containing organic solvent is at least one chlorinated hydrocarbon having 1-7 carbon atoms.

4. A column for gel-permeation chromatography according to claim 1, 2 or 3, wherein the chlorine-containing organic solvent is chloroform.

5. In a gel-permeation chromatographic method comprising passing an eluent dissolving a substance to be measured through a column packed with porous styrene-divinylbenzene type copolymer spherical particles in an immersed and swollen state with said eluent, and fractionating the substance depending on the largeness of molecular weight of said substance, the improvement which comprises using as the eluent a mixture of hexafluoroisopropanol and a chlorine-containing organic solvent in a mixing ratio of hexafluoroisopropanol to the chlorine-containing organic solvent of 5/95 to 70/30 by volume.

6. A method according to claim 5, wherein the chlorine-containing organic solvent is chloroform.

7. A method according to claim 5, wherein the chlorine-containing organic solvent is at least one chlorinated hydrocarbon having 1-7 carbon atoms.

8. A method according to claim 5, wherein said substance is a resin.

9. A method according to claim 8, wherein the resin is selected from a group consisting of polystyrene, an acrylic resin, polyethylene terephthalate, a polyethylene terephthalate oligomer, polyesterimide, polyesteramide, polyimide, polyamide-imide, polyamide, an epoxy resin, phenolic resin, and melamine resin.

10. A method according to claim 9, wherein said resin is selected from a group consisting of polyimide, polyamide, polyamide-imide, polyesteramide, polyethylene terephthalate, and a polyethylene terephthalate oligomer and said substance is measured at normal temperatures.

* * * * *